United States Patent Office 2,812,238
Patented Nov. 5, 1957

2,812,238

ALKALI METAL HYDROXYLAMINE DISULFONATES

John F. Quinn and Carl Osuch, Kirkwood, Mo., assignors to Monsanto Chemical Company, St. Louis, Mo., a corporation of Delaware No Drawing. Application August 27, 1956, Serial No. 606,183

6 Claims. (Cl. 23—114)

This invention relates to alkali metal hydroxylamine disulfonates and more specifically pertains to a method for preparing alkali metal hydroxylamine N,N-disulfonates without employing pre-formed sodium nitrite.

Alkali metal hydroxylamine N,N-disulfonates are useful in the preparation of oximes, the alkali metal hydroxylamine disulfonates being first converted to hydroxylammonium acid sulfate by hydrolysis of the disulfonate and the acid salt is then reacted with an aldehyde or ketone to form the oxime.

One process suggested for preparing an alkali metal hydroxylamine N,N-disulfonate involves reacting an alkali metal carbonate with sodium nitrite in an aqueous reaction medium with sulfur dioxide. Another process involves the reduction of an alkali metal nitrite with an alkali metal bisulfite and sulfur dioxide.

It has now been discovered that alkali metal hydroxylamine N,N-disulfonates can be prepared by reacting an alkali metal sulfite in an aqueous medium with nitrogen dioxide and nitric oxide until the reaction medium is acidic, preferably until the pH of the reaction medium is about 2 but the general progress of this step in the process can be followed by noting the color change of the reaction medium. The resulting reaction mixture can then be reacted with sulfur dioxide until there is no further color change. However, it is preferred to add a small amount of alkali metal sulfite to the reaction medium to bring the pH from 2 up to about 6 and then add the $SO_2$ until the reaction medium has a pH of about 1. This process can be represented according to the following reaction equation using sodium sulfite as illustrating the alkali metal sulfite

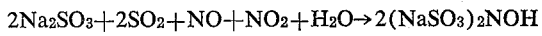

$$2Na_2SO_3 + 2SO_2 + NO + NO_2 + H_2O \rightarrow 2(NaSO_3)_2NOH$$

It will, of course, be understood that other alkali metal sulfites can be employed in the process of this invention. However, sodium sulfite is produced in certain chemical reactions as a by-product and thus is readily available as a low cost raw material. Also, it will be noted that the nitrogen dioxide and nitric oxide are generally available in equimolecular proportions from such reactions as the oxidation of ammonia or as by-products from the nitric acid oxidation of organic chemical compounds. Thus the use of these oxides of nitrogen also represent the use of readily available low cost raw materials.

The following examples are illustrative of the process of this invention and are not intended to be limitations thereon since modifications of the processes illustrated by these examples will be obvious to those skilled in the art. In these illustrative examples the term "parts" is employed to indicate parts by weight.

*Example I*

To a suitable reaction vessel there is added 600 parts of a mixture of ice and water and there is dissolved therein 126 parts of sodium sulfite. The resulting solution is cooled to about $-2°$ C. with stirring. Into this cooled solution nitric oxide is bubbled for a short period of time followed by the concurrent addition of nitrogen dioxide at a rate of at least equal to the rate of addition of the nitric oxide. During the course of the addition of the oxides of nitrogen the aqueous reaction medium darkens and the pH thereof goes from about 5.5 to about 12 and then to 2 at which pH the reaction medium is quite dark in color. Sufficient sodium sulfite is added to the solution until the pH is 6 or greater, about 2 to 3 parts. Thereafter sulfur dioxide is bubbled into the stirred slurry and the reaction temperature maintained at about $0°$ C. or slightly below. The pH of the reaction medium changes rapidly, the reaction medium darkens slightly and then becomes lighter in color. The color change of the reaction medium becomes lightest at about a pH of 1. An excellent yield of sodium hydroxylamine N,N-disulfonate is obtained.

From the yield of cyclohexanone oxime obtained by hydrolysis of the above product and reacting the resulting hydroxylamine acid sulfate with cyclohexanone, a sodium hydroxylamine N,N-disulfonate of excellent quality was obtained by the process described above.

*Example II*

To a suitable reaction vessel containing 800 parts of ice water there is added 126 parts of sodium sulfite with stirring. To this cold stirred solution there is added a gaseous mixture containing equimolecular proportions of nitrogen dioxide and nitric oxide. This gaseous mixture is added to the cold solution until the reaction medium becomes acidic, a pH of about 2. Thereafter, sulfur dioxide is added to the reaction medium until the color of the reaction medium becomes lighter and there is no further color change nor change in the pH of the aqueous medium. An excellent yield of sodium hydroxylamine N,N-disulfonate is obtained.

*Example III*

To a reaction vessel containing 700 parts of ice water there is added 158 parts of potassium sulfite with stirring. To the resulting cold solution of potassium sulfite there is added with stirring a gaseous mixture containing equimolecular proportions of nitrogen dioxide and nitric oxide obtained from the nitric acid oxidation of cyclohexanol until the reaction medium has a pH of 2. Potassium sulfite is added to the reaction mixture to adjust the pH to about 6. Thereafter sulfur dioxide is added until the reaction color of the reaction medium becomes lighter in color and until there is no further change in color or pH, pH about 1, of the reaction mixture. From the conversion of the potassium hydroxylamine, N,N-disulfonate through to cyclohexanone oxime it is determined that an excellent yield of potassium hydroxylamine N,N-disulfonate is obtained by the process herein described.

As hereinbefore stated the course of the reaction can be followed visually by the color changes but more precise control can be achieved by following the progress of the reaction potentiometrically or by following the pH changes of the aqueous reaction medium.

Although it has hereinbefore been stated that the alkali metal sulfonates, especially sodium sulfite and the oxides of nitrogen, employed in this invention can be advantageously obtained as by-products from particular reactions, the process of this invention is not so limited for the reactants employed in the process of this invention may be obtained from any source without departing from the spirit and scope of the invention. Also, as hereinbefore stated the precise proportions of the reactants and chemically equivalent alkali metal sulfonates may be varied without departing from the spirit and scope of the invention as defined in the appended claims,

What is claimed is:

1. In the process for preparing alkali metal hydroxylamine N,N-disulfonates which comprises reacting an alkali metal sulfite with nitrogen dioxide, nitric oxide in an aqueous reaction medium until the reaction medium is acidic and thereafter reacting the resulting acidic mixture with sulfur dioxide until the resulting reaction medium becomes lighter in color and no further color change occurs.

2. In the process for preparing alkali metal hydroxylamine N,N-disulfonates which comprises first reacting a mixture of oxides of nitrogen containing equimolecular proportions of nitrogen dioxide and nitric oxide with an alkali metal sulfite dissolved in water until the reaction has a pH of about 2, adjusting the pH of the reaction mixture to about 6 with additional alkali metal sulfite, and thereafter reacting the resulting aqueous medium with sulfur dioxide until the resulting reaction medium becomes lighter in color and no further color change occurs.

3. In the process for the preparation of sodium hydroxylamine N,N-disulfonate which comprises reacting sodium sulfite with nitrogen dioxide and nitric oxide in an aqueous reaction medium until the aqueous reaction medium has a pH of about 2, adjusting the pH of the reaction medium to about 6 by the addition of sodium sulfite, thereafter reacting the reaction mixture with sulfur dioxide until the reaction medium has a pH of about 1.

4. In the process for the preparation of potassium hydroxylamine N,N-disulfonate, the steps comprising reacting an aqueous solution of potassium sulfite with a mixture of nitrogen dioxide and nitric oxide containing these oxides in equimolecular proportions until the reaction mixture has a pH of about 2, adding potassium sulfite to the reaction medium to adjust the pH to about 6 and reacting the resulting aqueous reaction mixture with sulfur dioxide until the pH of the reaction medium is about 1.

5. In the process for the preparation of potassium hydroxylamine N,N-disulfonate which comprises reacting potassium sulfite with nitrogen dioxide and nitric oxide in an aqueous reaction medium until the aqueous reaction medium has a pH of about 2, adjusting the pH of the reaction medium to about 6 by the addition of potassium sulfite, thereafter reacting the reaction mixture with sulfur dioxide until the reaction medium has a pH of about 1.

6. In the process for the preparation of sodium hydroxylamine N,N-disulfonate, the steps comprising reacting an aqueous solution of sodium sulfite with a mixture of nitrogen dioxide and nitric oxide containing these oxides in equimolecular proportions until the reaction mixture has a pH of about 2, adding sodium sulfite to the reaction medium to adjust the pH to about 6 and reacting the resulting reaction mixture with sulfur dioxide until the pH of the reaction medium is about 1.

No references cited.